United States Patent
McDonald et al.

(10) Patent No.: US 7,062,426 B1
(45) Date of Patent: Jun. 13, 2006

(54) METHOD FOR CALCULATING MEMORY REQUIREMENTS FOR THIN CLIENT SIZING TOOL

(75) Inventors: Kathryn Ann McDonald, Yorba Linda, CA (US); Leonard Eugene Eismann, Rancho Santa Margarita, CA (US); Sharon Marie Lee, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 1131 days.

(21) Appl. No.: 09/813,669

(22) Filed: Mar. 21, 2001

(51) Int. Cl.
  *G06F 9/45* (2006.01)
  *G06F 15/177* (2006.01)

(52) U.S. Cl. .............. 703/22; 703/2; 709/221; 709/226; 718/104

(58) Field of Classification Search .......... 395/674, 395/500; 709/220, 221, 223, 226, 213; 703/2, 703/22; 711/114; 707/204; 714/37, 46; 702/186; 718/104
See application file for complete search history.

(56) References Cited

U.S. PATENT DOCUMENTS

| | | | |
|---|---|---|---|
| 5,500,934 A * | 3/1996 | Austin et al. | 345/853 |
| 5,668,995 A * | 9/1997 | Bhat | 718/104 |
| 6,212,559 B1 * | 4/2001 | Bixler et al. | 709/221 |
| 6,334,196 B1 * | 12/2001 | Smorodinsky et al. | 714/37 |
| 6,496,948 B1 * | 12/2002 | Smorodinsky | 714/37 |
| 6,567,767 B1 * | 5/2003 | Mackey et al. | 702/186 |
| 6,571,283 B1 * | 5/2003 | Smorodinsky | 709/220 |
| 6,665,714 B1 * | 12/2003 | Blumenau et al. | 709/222 |
| 6,691,259 B1 * | 2/2004 | Mackey et al. | 714/46 |
| 6,754,702 B1 * | 6/2004 | Kennelly et al. | 709/223 |
| 6,779,082 B1 * | 8/2004 | Burger et al. | 711/114 |
| 6,834,326 B1 * | 12/2004 | Wang et al. | 711/114 |
| 6,847,984 B1 * | 1/2005 | Midgley et al. | 707/204 |

* cited by examiner

*Primary Examiner*—Russell Frejd
(74) *Attorney, Agent, or Firm*—Alfred W. Kozak; Mark T. Starr; Lise A. Rode

(57) ABSTRACT

A method and procedure is established for utilization in a Thin Client Sizing Tool which has established an optimized solution of one or more Server Farms to fit a customer's profile. Part of implementing this solution is the provision of establishing adequate memory for the Server Farm or group of Server Farms. A methodology is provided whereby each operating system is correlated to each User type which is correlated to each application and then increased by the number of particular User types and the number of applications involved in order to establish the total memory requirements for a Server Farm or Metafarm.

12 Claims, 3 Drawing Sheets

METHOD FOR CALCULATING MEMORY REQUIREMENTS FOR THIN CLIENT SIZING TOOL

CROSS-REFERENCES TO RELATED APPLICATIONS

This application is related to co-pending applications designated hereinbelow and which are all included herein by reference.

U.S. Ser. No. 09/813,667 entitled "THIN CLIENT SIZING TOOL FOR ENTERPRISE SERVER FARM SOLUTION CONFIGURATOR";

U.S. Ser. No. 09/813,671 entitled "CONFIGURATION INTERVIEW SESSION METHOD FOR THIN CLIENT SIZING TOOL";

U.S. Ser. No. 09/813,672 entitled "METAFARM SIZER CONFIGURATION OPTIMIZATION METHOD";

U.S. Ser. No. 09/813,670 entitled "SOLUTION GENERATION METHOD FOR THIN CLIENT SIZING TOOL";

U.S. Ser. No. 09/813,668 entitled "METHOD FOR CALCULATING USER WEIGHTS FOR THIN CLIENT SIZING TOOL";

U.S. Pat. No. 6,496,948 entitled "METHOD FOR ESTIMATING THE AVAILABILITY OF AN OPERATING SERVER FARM";

U.S. Pat. No. 6,571,283 entitled "METHOD FOR SERVER FARM CONFIGURATION OPTIMIZATION";

U.S. Ser. No. 09/705,441 entitled "METHOD FOR SERVER METAFARM CONFIGURATION OPTIMIZATION".

FIELD OF THE INVENTION

A method is disclosed for generating the memory requirements suitable for a Thin Client Sizing Tool. Each User-Type and each Application in the Server Farm network is analyzed in order to develop the overall memory requirements for the system which has been configured for a particular client-user.

BACKGROUND OF THE INVENTION

The present disclosure involves material used for newly-developing enterprises which have multiple users at several different sites and present different types of problem situations to a proposal-maker, designer and configurator of Server Farm facilities.

Part of the solution is the need and requirement to establish and utilize the memory requirements involved according to the data in the customer profile which was produced in connection with U.S. Ser. No. 09/813,667.

During the process of estimating and configuring a series of Server Farms for a customer's enterprise, there arises the problem of sizing the correct amount of memory which will be required according to the number of applications used, the various User-Types involved, the servers, and the number of servers that are involved in the network, which is configured for a particular customer-user.

The presently described method for calculating the memory requirements suitable for the overall Thin Client Sizing Tool operation is provided for with a specific algorithm which takes into consideration each User-Type, each application, the number of servers involved in the configuration, and other particular factors which enable a very close estimation of the memory requirements for the particular configuration which is to be proposed.

SUMMARY OF THE INVENTION

A method is provided for utilization with a Thin Client Sizing Tool which allows for information of a customer-user's requirements to be utilized in order to configure an applicable Server Farm which will satisfy the operational needs of the customer's enterprise.

Consideration is made for each particular User-type with regard to each application used in the configuration, plus the type and number of servers involved in the configuration, which then enables the calculations to be made for providing the overall memory requirements needed for the particular working configuration.

Adjustments to the memory requirements are made if more than one server is involved and special increments to memory are added when an application is MS-DOS or 16-bit.

GLOSSARY LIST OF RELEVANT ITEMS

Figure 1A:
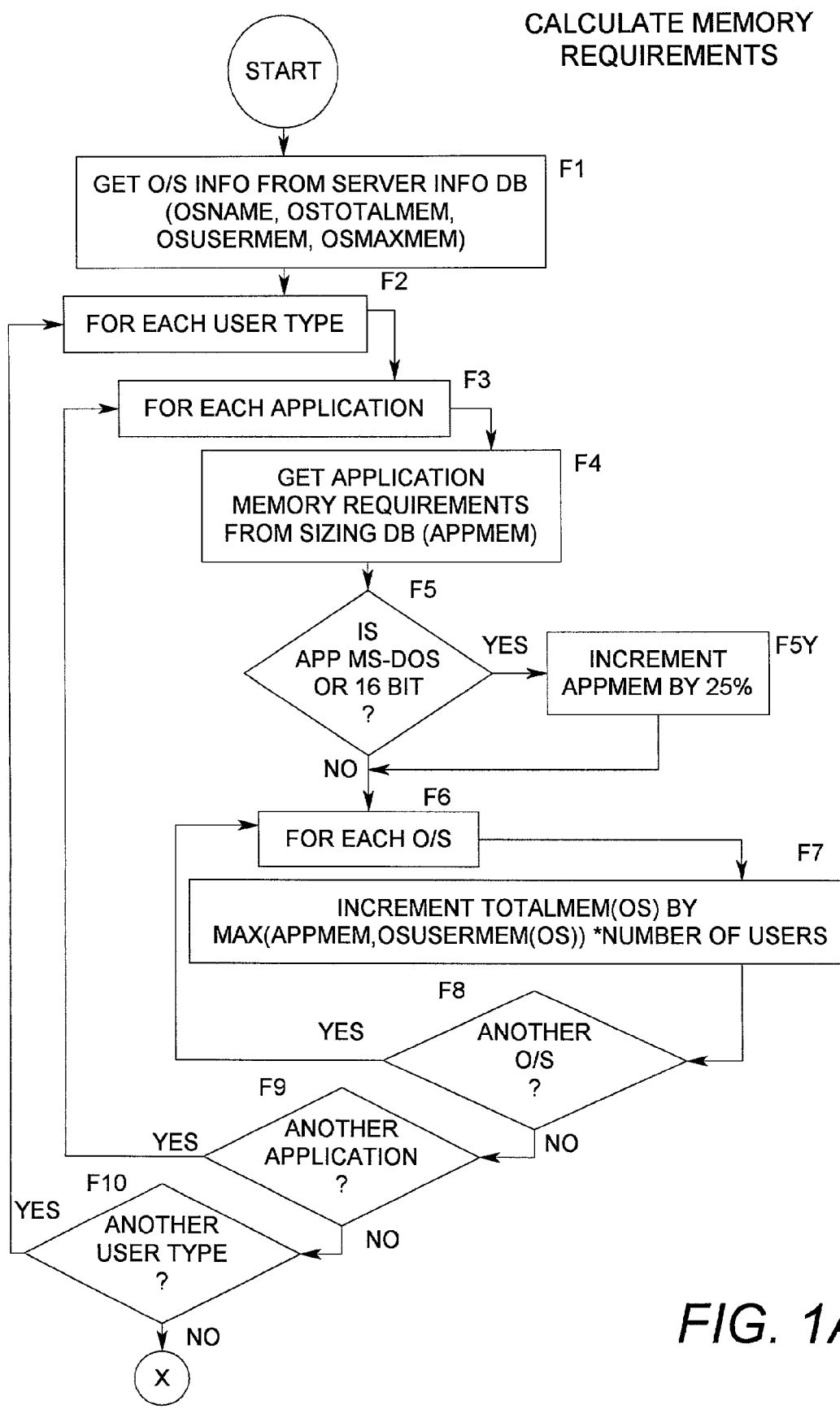
FIGS. 1A and 1B are flowcharts indicating a series of steps for calculating the memory requirements for a particular solution configuration.

1. ADJUSTED USER TOTAL (SERVER FARM): The normalized total number of Users that will be supported by the SERVER FARM. Unadjusted Users are grouped into 4 distinct usage-pattern categories, namely (a) Light, (b) Medium, (c) Heavy, and (d) Super Heavy. Calculations are performed on the number of Users in each grouping to determine the normalized number of Users. These normalized numbers are then summed to establish the ADJUSTED USER TOTAL for the entire SERVER FARM.

2. APPINPUT: GUI-based—This requires limited User input such as an application developed with Microsoft Visual Basic where selections are made from lists or by clicking various options. Text-based—Requires considerable typing by the User such as creating a document in Microsoft Word.

3. APPLICATION DELIVERY SOLUTION CONFIGURATOR: This is the Unisys approved and recognized designation of the present method and system as defined by this invention. This is a Windows application that helps one in choosing the best-developed Application Delivery (Thin Client) server solution that will meet a client's requirements. This Solution Configurator guides one through a customer interview session where information is gathered in order to develop a set of solutions that will match the customer's performance requirements but also provide different availability levels suitable to the customer-client.

4. APPLICATION SERVER: This is the intended use or responsibility of one of the designated server farms. This type of server farm would run computer programs or pieces of software designed to perform specific multi-user tasks solely within the Windows Terminal Server systems making up the server farm. APPLICATION SERVERS would not be dependent on other back-end servers for the processing of data.

5. APPLICATION TYPE: This is one of four main interview categories used by the described Thin Client Sizer Tool for collecting customer information and collecting also Application Type documents involving the memory and the disk resources typically required when running an application. Supplying the Application Types that will be running helps to size the Server Farm in order to sufficiently handle the client demand.

6. APPMEM: In the computer program that constructs the Thin Client Sizing Tool, this is a symbol that represents the amount of memory that should be allocated for each application by the Operating System. These applications are the computer programs or pieces of software that will be run on the servers in the Server Farm.

7. APPOUTPUT: Text-based—Indicates the kind of information presented by the application. For example, most Visual Basic or C++ windows and dialog boxes, most uses of productivity apps (Microsoft Office), terminal emulation, etc. Graphic-based—Indicates the kind of information presented by the application. For example, desktop publishing large documents with graphics, Web pages with a lot of picture content (JPEG files), scanned images (TIF files), Microsoft Encarta, etc.

8. APPPROCESSING: Light—Indicates the application executing on the terminal server does little more than present a GUI. For example, a Visual Basic application, the SAP thin client, light use of productivity apps (Microsoft Office), terminal emulation, etc. Heavy—Indicates the application executing on the terminal server uses more processor, memory or disk resource usage. For example, the PeopleSoft Thin Client, Outlook Exchange client, heavy use of productivity apps for complex tasks (desktop publishing, large documents with graphics, extremely large spreadsheets with complex cascading calculations, etc.)

9. AVAILABILITY: This is a measure of the readiness of the system and an application to deliver an expected service to the User with a required performance level. It may be described as a percentage of time that a system and an application are running as distinguished from the system being down for maintenance or repairs.

10. AVAILABILITY GOAL: This is the target service level as defined by the client for the server farm. This data value is input to the tool as a percentage of time that the client expects the systems and applications in the server farm to be accessible by all Users.

11. AVAILABILITY TAB WINDOW (FIG. 24 of Ser. No. 09/813,667: This shows the Availability Calculator which helps to determine solutions that include future/growth potential requirements with a variety of redundancy levels. This screen is interactive and will take input for Adjusted Concurrent number of users, system repair times and redundancy levels. This screen is interactive and will take input for Adjusted Concurrent number of users, system repair times and redundancy levels and returns solution information such as estimated number of servers, # peak users, availability, estimated downtime, # redundant servers and server farm mean time to failure (MTTF).

12. BACKGROUND PROCESSING: The ability of a user-interactive software application to execute processing steps independent of the input and output actions. Background processing would include, but is not limited to, procedures such as "always on" spell checking in a word processor or 'always on' calculations in a spreadsheet.

13. BENCHMARK: This is test of computer performance and consists of a test or set of tests used to measure the performance of an individual e-Action ES Terminal Server. The output from these tests consists of a value designated as the total number of Users that each e-Action ES Terminal Server system can reasonably sustain and process.

14. BASE SOLUTIONS TAB WINDOW (FIG. 23 Ser. No. 09/813,667: Reports the minimum server configuration recommendation (i.e., not including additional redundancy or growth considerations) for each of the customer Site's server farms. A base solution includes the minimum number of servers and GB RAM required with regard to the Operating system, # processors and MHz available for each server type supported by Unisys.

15. CITRIX METAFRAME: This is computer software from Citrix Systems, Inc., headquartered in Ft. Lauderdale, Fla. This METAFRAME software is loaded onto each Windows Terminal Server and provides superior enterprise-level management and control functions for the e-@ction Enterprise Servers.

16. CITRIX METAFRAME ADD-ONS: ICA Secure and Load Balancing Services are two optional computer softwares that can be run simultaneously with CITRIX METAFRAME on a Terminal Server. ICA Secure provides enhanced network security for METAFRAME. Load Balancing Services allow Citrix MetaFrame to distribute application processing to the plurality of computer systems in a server farm.

17. CONCURRENT USERS: This number is an estimate of the maximum number of users simultaneously processing applications on a Server Farm at any given time. This is characteristically a percentage of the total Benchmark users that can be sustained on all of the e-@ction Enterprise Servers in the Server Farm.

18. CONFIGURATION DATABASE TEMPLATE: This is a collection of data on a computer applied during the information collection process and utilized for the assembly of information collected from window screens.

19. CONFIGURATION SESSION: This is the vehicle used by the described Thin Client Sizer Tool to collect the information on a customer's sizing requirements and to generate the best solution to meet those requirements.

20. CONFIGURATION SESSION DATABASE: This is a collection of data on a computer used for providing information to an instance of the Application Delivery Solution Configurator that enables algorithmic steps and calculations to be applied in the development of an optimized configuration for the Server Farm.

21. CONFIGURATOR: See APPLICATION DELIVERY SOLUTION CONFIGURATOR.

22. CUSTOMER DATA TAB WINDOW (FIG. 22 OF Ser. No. 09/813,667: Reports back to the customer the information that was collected during the interview session and that which the solution generation was based on.

23. CUSTOMER PROFILE: This is a collection of data describing the customer's characteristics and attributes and assembled from the customer interview. This data is input to an algorithm which will output a configuration solution for that particular User or customer.

24. DEFAULT AVAILABILITY: The four (4) SERVER FARM initial availability level scenarios as calculated and displayed by the AVAILABILITY CALCULATOR. The availability levels for the Server Farm are calculated based on the following three parameters: (1) the number of adjusted concurrent users, (2) the system repair time, and (3) the REDUNDANCY FACTOR. For the four DEFAULT AVAILABILITY levels, the first parameter is calculated based on the sizing of the SERVER FARM, and the latter two parameters have pre-configured values, as chosen by the Engineering Group, where the second parameter is held constant at 6 hours and the second parameter is varied from 25% to 10% in decrements of 5%.

25. DISK CAPACITY TAB WINDOW (FIG. 27 OF Ser. No. 09/813,667: Reports on the disk capacity requirements determined by the interview session input and solution generation algorithms for each of the customer Site's Server Farms.

26. DOWNTIME: The downtime or repair time for a single application server is the time interval required to restore the server and system back to normal business operation. At the end of the repair period, the applications running on the repaired server are available to Users. The downtime for a Server Farm is the time interval required to restore the nominal Server Farm performance.

27. e-@CTION ENTERPRISE SERVER (ES): This is the specific name for a plurality of server models marketed and sold by Unisys Corporation. Current models include ES7000, ES5000, and ES2000 systems.

28. ESTIMATOR PROGRAM: This is a program which performs method steps for estimating system parameters such as the availability of an application program to run on any computer or server in the cluster of at least two servers or computers. This type of estimator program was the subject of U.S. Pat. No. 6,334,196 which is incorporated herein by reference. Another estimator program is the subject of this patent application.

29. ETO: This represents engineering technology optimization and involves an organization located at a specific company location that is devoted to optimizing the performance of the Enterprise-class Windows NT Server platforms.

30. FAILOVER: This is a mode of operation in the system which has two or more servers or computers wherein a failure in one of the servers or computers will result in transfer of operations to the other or another one of the still operating servers and computers. Failover time is the period of time required for successful transfer from a failed server to an operative server.

31. GB (GIGABYTE): A unit of computer memory or disk storage space equal to 1,024 megabytes.

32. INPUT CHARACTERISTICS: These attributes describe how input is provided to the customer's software applications—through textural typing, through GUI based screen manipulation, or through a combination of both methods.

33. KBPS REQUIREMENTS (SERVER FARM): This is the total data transmission capacity (or bandwidth), measured in kilobytes per second (Kbps), which will be needed for all bi-directional communication between the Users' concurrent connections and the SERVER FARM(s).

34. MAX(number1,number2, . . . ) FUNCTION: A mathematical function that returns the largest value in a set of values.

35. MB (MEGABYTE): A unit of computer memory or disk storage space equal to 1,048,576 bytes.

36. MEAN TIME TO FAILURE (MTTF): This is the average operating time between two failures, that can be estimated as the total operating time divided by the number of failures.

37. MEAN TIME TO REPAIR (MTTR): This is the average "downtime" in case of failure, that can be estimated as the total downtime divided by the number of failures.

38. MEMORY REQUIREMENTS: This is the necessary amount of server memory used by each User's instance of the multi-user software application.

39. MIN(number1,number2, . . . ) FUNCTION: A mathematical function that returns the smallest value in a set of values.

40. NETWORK CAPACITY TAB WINDOW (FIG. 26 OF U.S. Ser. No. 09/813,667 This is called Network Utilization now; reports on the estimated network activity measured in Kbps for each of the customer Site's Server Farms.

41. NUMOS: In the computer program that constructs the Thin Client Sizing Tool, this is a symbol that represents an integer number of Operating Systems which are being supported by the Unisys Engineering group.

42. OPERATING SYSTEM (O/S): This is the master control program in each server in the Server Farm. The Unisys Engineering group sizes and evaluates each one to determine its memory usage characteristics and provides this data to the Server Info DB. Examples of OPERATING SYSTEMS are (a) Microsoft Windows NT Server 4.0, Terminal Server Edition, and (b) Microsoft Windows 2000 Server.

43. OPTIMIZATION CRITERION: This is a function that determines the value of one of the essential system attributes and must be minimized (or maximized) by variation of one or more system parameters that are chosen as OPTIMIZATION PARAMETERS. Each optimization parameter should have a predefined domain that defines the values that the optimization parameter may assume.

The OPTIMIZATION CRITERION is a focus of an optimum system design or configuration. The examples of the optimization criteria are system performance, system availability, and cost of ownership.

44. OPTIONAL SOFTWARE TAB WINDOW (FIG. 25 OF U.S. Ser. No. 09/813,667 Reports on the additional features/capabilities entered in the interview session regarding the customer's profile for each of the Site's Server Farms. Optional software requirements include such categories as Client Connection Methods, Enhancements, Environment support, Multimedia capabilities, Display characteristics, Protocol support, and Server Enhancements.

45. OSMAXMEM: In the computer program that constructs the Thin Client Sizing Tool, this is a symbol that represents the array in which information is stored corresponding to the maximum amount of memory that can be used by each Operating System that is supported by the Unisys Engineering group.

46. OSNAME: In the computer program that constructs the Thin Client Sizing Tool, this is a symbol that represents the array in which information is stored denoting the names of each of the Operating Systems that are supported by the Unisys Engineering group.

47. OSTOTALMEM(OS): In the computer program that constructs the Thin Client Sizing Tool, this is a symbol that represents the array in which information is stored corresponding to the minimum amount of memory to configure on each server in a Server Farm for each Operating System. While analyzing the users of the servers and the applications which will be run on the servers, the Thin Client Sizing Tool will increment this value according to the memory usage of these objects.

48. OSUSERMEM(OS): In the computer program that constructs the Thin Client Sizing Tool, this is a symbol that represents the array in which information is stored denoting the amount of server memory for each Operating System to allocate for each user of the server.

49. OUTPUT CHARACTERISTICS: These attributes describe how output is derived from the customer's software applications—through the display of visual information as text, as graphics, as animated graphics, or as a combination of one or more methods.

50. PROCESSING CHARACTERISTIC: This attribute describes whether the customer's software application performs extensive BACKGROUND PROCESSING, independent from the processing of application input and output.

51. REDUNDANCY FACTOR (Rf): This is a measure of the additional number of Users that can be added to the nominal number of Users per server without exceeding the track maximum number of Users per server (server performance benchmark maximum of Users). It is a difference between maximum and nominal performance as a percentage of the maximum performance. The Redundancy Factor can be calculated as 100 percent minus a usage factor Uf.

52. SERVER CONFIGURATION REPORT: This is a report generated by the Thin Client Sizer Tool that will contain the information on the optimum server configurations as determined by the customer information which was collected during the Configuration Session and the performance benchmarking results.

53. SERVER FARM: This is one of the five main interview categories used by the Thin Client Sizer Tool for collecting customer information. A Server Farm consists of one or more Windows Terminal Servers configured together for unified administration, security, and for communication services. For instance, two Server Farms might be required for certain applications such as the PeopleSoft clients, or one server for a Payroll function, and another server for a Human Resources function.

54. SERVER FARM AVAILABILITY CALCULATOR: This is an estimator program that estimates the availability for the Server Farm.

55. SERVER FARM OVERFLOW: The condition whereby the results of calculations on the number of servers in a SERVER FARM, during the Solution Generation phase, exceeds the maximum number of servers recommended for a SERVER FARM as determined by the Engineering Group.

56. SERVER INFORMATION DATABASE: This is a collection of data on a computer for holding benchmark and informational data on a plurality of Unisys Enterprise Server systems. This data is used by the Thin Client Sizing Tool in determining the optimum server farm configuration to meet the customer's sizing requirements.

57. SERVER MEMORY: This is the total amount of memory required by each server in the Server Farm. It is calculated by first accumulating the memory required by all Operating Systems, all users, and all of the application programs in the configured system, and then dividing this value by the total number of servers in the Server Farm.

58. SERVER MEMORY REQUIREMENTS: After applying some final validation checks on the amount of SERVER MEMORY, this is the final value calculated by the present method, and it represents the total amount of memory for each server in the Server Farm required to fulfill the needs of a particular client-user and their overall system configuration.

59. SITE: This is one of the five main interview categories used by the Thin Client Sizer Tool for collecting customer information. A Site is the physical location where the Windows Terminal Servers will be located in particular cities such as, New York, Los Angeles or Chicago, etc. and the number of users at that physical location.

60. SITE/SERVER FARM PAIR: This is a defined combination of a specific Server Farm residing within a particular physical location. As defined during the customer interview, each physical location, or site, can contain one of more Server Farms. When defining the User and Application characteristics of each Server Farm within the site, each individual combination is considered as an independent pair.

61. SIZING DATABASE: This is a collection of data on a computer output from the THIN CLIENT SEVER FARM AVAILABILITY CALCULATOR and used for storing the number of e-@ction Enterprise Server unit modules and their availability levels.

62. SOLUTION CONFIGURATOR: See APPLICATION DELIVERY SOLUTION CONFIGURATOR.

63. SOLUTION GENERATION: The act of producing a particular SERVER FARM configuration (i.e. the SOLUTION) that will meet the sizing and availability requirements of a client. This SOLUTION will be comprised of an appropriate number of servers, proper disk space and memory to meet the client requirements.

64. THIN CLIENT SERVER FARM AVAILABILITY CALCULATOR: This is one of the examples of the SERVER FARM AVAILABILITY CALCULATOR. Because Thin Client configurations are intended to make applications available to multiple Users at the same time, this calculator calculates the availability of a specified number of instances of an application (not just a single instance) where each application instance is being run at the server, but all the User input response is taking place at the client terminal. In this scenario, downtime occurs whenever the number of available instances of the application drops below the required specified number of instances.

65. UCON32: This is the unit designated as the Unisys Configurator which is an extensive on-line configuration tool which is used to support all Unisys Corporation system platforms.

66. USAGE FACTOR (Uf): This is the ratio of the nominal number of Users per server to the maximum number of Users per server (server performance benchmark maximum of Users) times 100 percent.

67. USER-TYPE: This is one of the five main interview categories used by the Thin Client Sizer Tool for collecting customer information. A User-Type embodies the usage patterns of a particular group of Users. User usage patterns will have a significant impact on performance. The area which is considered here is the user's typing speed. Some examples of User-types are, order entry clerks, secretaries, developers, and technical writers.

68. USER WEIGHT: This is the estimated average user impact (light, medium, heavy or super heavy) on the Windows Terminal Server, and a value is assigned to each User Type by the sizing tool. Such User attributes as typing speed or application familiarity can all affect this parameter. It is used to approximate the amount of server processor usage that is imposed by the different User Types.

69. WINDOWS TERMINAL SERVER: This is the designation for an e-@ction Enterprise Server that is running one of two operating systems sold and supported by Microsoft Corporation: (1) Windows NT Server 4.0, Terminal Server Edition, or (2) Windows 2000 (Server, Advanced Server, or Datacenter Server) with the optional Terminal Services service enabled in Application Server mode.

DESCRIPTION OF PREFERRED EMBODIMENT

Figure 2:
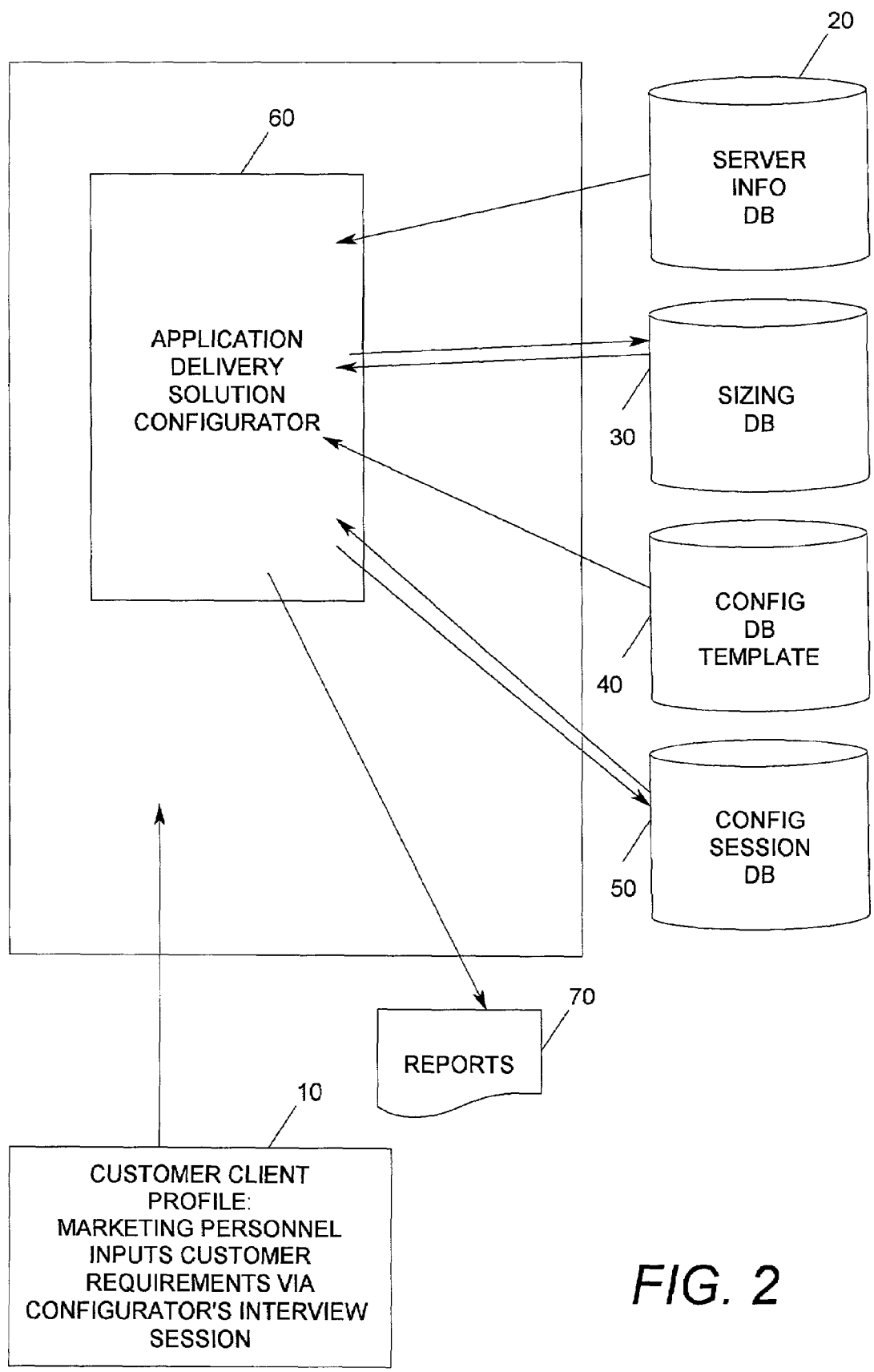
FIG. 2 is a drawing showing the environment involved in the Thin Client Sizing Tool.

FIG. 2 is an overall environmental drawing of a Thin Client Solution Sizing Tool, which provides a configuration method and which indicates the various elements involved in providing and optimizing enterprise server solutions for a customer's enterprise.

As seen in FIG. 2, the Application Delivery Solution Configurator program 60 has a series of input and output connections which include an input from the Customer-Client Profile 10, plus inputs from the Server Information Database 20, from the Sizing Database 30, the Configuration Database Template 40, and the Configuration Session Database 50. Additionally, the algorithm of the Application Delivery Solution Configurator 60 also provides information to the Sizing Database 30, and to the Configuration Session Database 50, after which a final series of information and reports can be provided at the Reports Module 70.

The Application Delivery Solution Configurator program 60 has a number of areas, which must be fulfilled or satisfied in order to provide the final report at the Reports Module 70. One of these inputs, which must be calculated and provided to the Solution Configurator 60, is that of the present invention, which involves the method for calculating the memory requirements for the server network.

Figure 1B:
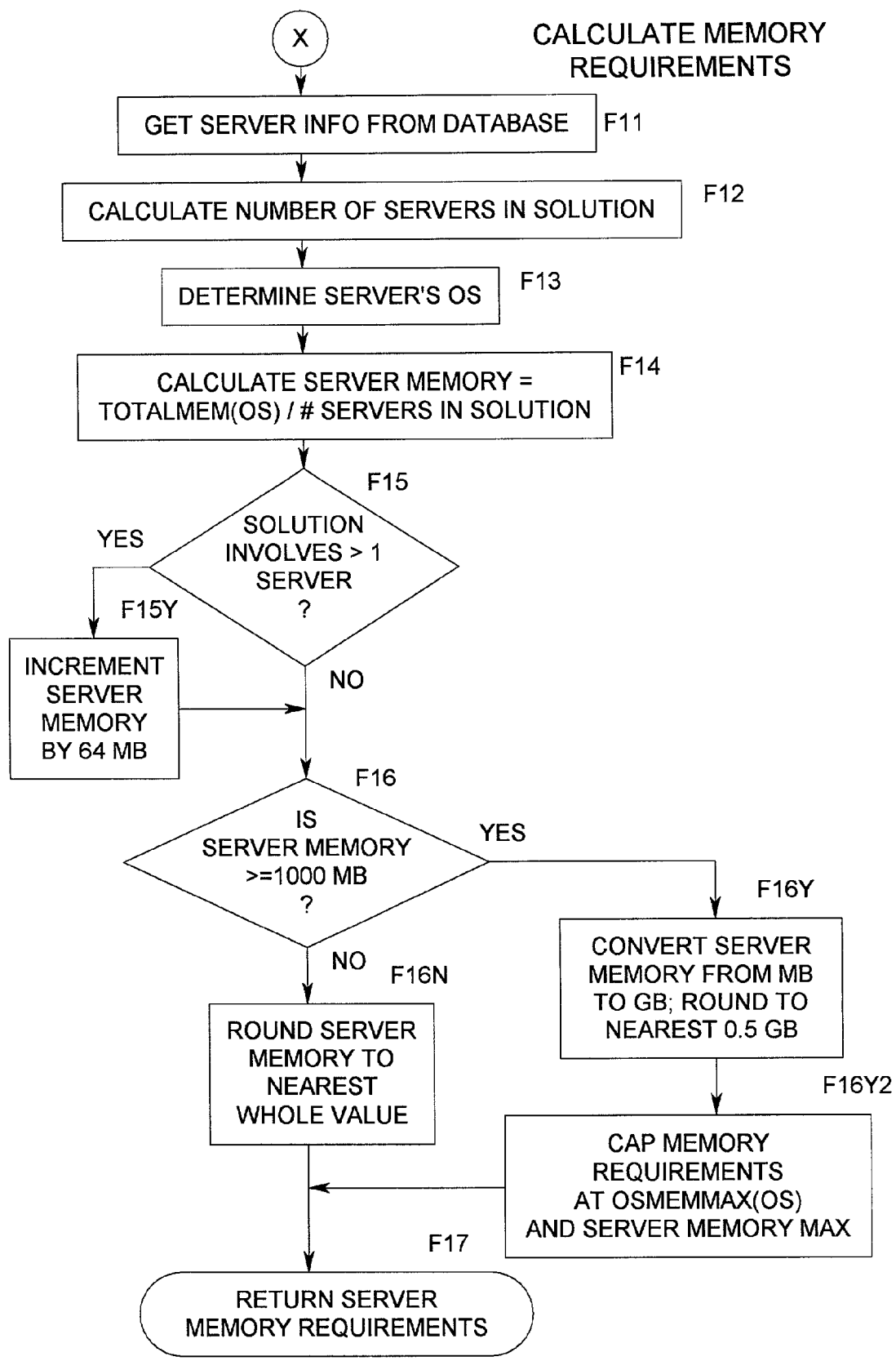

FIGS. 1A and 1B will indicate a series of method steps which apply to the configuration that is proposed in order to develop the memory requirements which will be necessary.

The process of Calculating Memory Requirements is determined by first assuming that the Configuration Interview Session U.S. Ser. No. 09/813,667 has been completed and a customer profile is stored in a Configuration Session Database (FIG. 2, item 50). The memory requirements for a Server Farm's server solution are required as part of the Solution Generation method in U.S. Ser. No. 09/813,670.

As an example configuration and for better illustration, it will be noted that a specific set of numbers will be used to describe an example customer profile. Table I shows a bird's eye view of a possible Server Farm within a Customer profile that will be used to show a specific set of circumstances and illustrate the use of this method. This Server Farm (Manufacturing) example has 750 concurrent Users and 3 applications designated A, B and C.

TABLE I

Server Farm: Manufacturing (750 concurrent users)

|  | Application A | Application B | Application C (16-bit) |
|---|---|---|---|
| # Developer Users | 200 | 100 | 50 |
| # Tester Users | 0 | 300 | 100 |
| Memory Requirements | 12 MB | 6 MB | 8 MB |

FIG. 1A shows the code flow for the complete process of calculating memory requirements for a Server Farm within the Thin Client Sizer Solution Generation (as explained in detail by U.S. Ser. No. 09/813,670). This process begins with step (F1) by obtaining the supported Operating Systems' information. This information is stored in the Server Info DB (item 20, FIG. 2) and is originally entered by the Unisys Engineering team according to the supported Operating System's specifications. At this point in the method, this Operating System (O/S) information is temporarily stored in arrays for easy access. The O/S information that is relevant to this method includes such information as:

O/S name (stored in an array called OSNAME),

Base memory requirements (stored in an array called OSTOTALMEM as an initial value), User memory requirements (stored in an array called OSUSERMEM), and Maximum memory requirements (stored in an array called OSMAXMEM).

Also noted, in an integer variable called NUMOS, is the number of Operating systems that are currently being supported. Typically, there would be between 2 and 5 operating systems that would be supported at one time. See Table II for values that this example will use as Operating System memory characteristics.

TABLE II

Operating System Memory requirements

| Name (OSNAME) | Base Memory Requirements (OSTOTALMEM) | User Memory Requirements (OSUSERMEM) | Max. Memory Requirements (OSMAXMEM) |
|---|---|---|---|
| OSx | 32 MB | 8 MB | 4 GB |
| OSy | 128 MB | 9 MB | 64 GB |

After this information has been retrieved and stored (step F1), a loop begins at step (F2) where the first User-Type defined (in our example, Developers) within the Server Farm is considered. At step (F3), a secondary loop is entered for all of the applications being used by Developers, which would start with Application A in our example. Then at step (F4), the application information is extracted from the Sizing DB (item 30, FIG. 2), namely the application's memory requirements (stored in a single variable named APPMEM) and whether it is an NS-DOS or 16-bit application (versus a 32-bit application). This application information is originally stored either by the Unisys Engineering Team as attributes of a pre-defined application or during the Configuration Interview Session as in U.S. Ser. No. 09/813, 668 as attributes of a user-defined application. As per our example values in Table I, the Application A's memory requirements are 12 MB.

Step (F5) then asks "Is the Application MS-DOS or 16-bit?" which is answered "No" and the flow continues to step (F6) where the last loop is entered to consider all Operating Systems that are currently supported by Unisys. For the sake of our example, 2 operating systems, OSx and OSy, Table II, are currently being supported so that the first one being considered would be OSx. If step (F5) is a "Yes", then the Application Memory value at step (F5Y) is incremented by 25% percent.

Within the Operating System loop at step (F7), the maximum amount of memory between the application's memory requirements and the Operating System's user memory requirements is multiplied by the number of User-Type Users—Developers—using the Application—Application A—which, as per Table I, is 200 users. So that the maximum of 12 MB and 8 MB is 12 MB times 200 users equals 2400 MB of memory which is deemed necessary for all Developers using Application A. This number is added to the OSTOTALMEM for the Operating System OSx which was initially set to be the Operating System's base memory requirements (32 MB) making the new OSTOTALMEM for OSx=32+2400=2432 MB.

The O/S loop limits are checked at step (F8) and answered with "Yes" because there are more Operating Systems to consider and the flow returns to (F6) where the next O/S, OSy, is considered. Step (F7) increments OSTOTALMEM for Operating System OSy from 128 MB (its base memory requirements) to 2528 MB since the maximum between OSy's User memory requirements of 9 MB and the application's memory requirements of 12 MB is 12 MB times 200 Developers using Application A and 128+(12*200)=128+ 2400=2528 MB. The question "Another O/S?" is asked at step F8 and answered with "No". The next loop limit for "applications" is checked at step and answered with "Yes", since there is another Application to consider—which is Application B in step (F3). Application B's characteristics are then obtained from the Sizing DB (item 30, FIG. 2) in step (F4) so that its memory requirements are found to be 6 MB (as per the values being used from Table I).

Again, at step (F6), each Operating System is considered, beginning with OSx where step (F7) then increments the OSTOTALMEM array entry for OSx from 2432 MB to 2432+(MAX(6, 8)*100)=2432+(8*800)=2432+800=3232 MB. The next Operating System OSy is then considered ("Yes" at step F8) leading us to increment OSTOTALMEM entry for the OSy Operating System from 2528 MB to 2528+(MAX(6, 9)*100)=2528+(9*100)=2528+900=3428 MB. At this point, the OSTOTALMEM for OSx is 3232 MB and for OSy it is 3428 MB. That concludes the O/S loop ("No" is answered at (F8)) and step (F9) asks "Another Application?" which is answered "Yes" and step (F3) produces Application C for consideration.

Step (F4) gets Application C's memory requirements, storing 8 MB into the APPMEM variable, and notes that it is a 16-bit application. So that, at step (F5), the question "Is Application MS-DOS or 16-bit?" is answered "Yes" and flow moves to step (F5Y) where the application's memory requirements are increased by 25%, changing APPMEM from 7 MB to 7*1.25=8.75 MB. The O/S loop is entered at step (F6) considering first the Operating System Osx, and step (F7) increments OSTOTALMEM for OSx from 3232 MB to 3232+(MAX(8.75, 8)*50)=3232+(8.75*50)=3232+437.5=3669.5 MB. At step (F8), "Another O/S?" is answered "Yes" and at step (F6), the next Operating System, OSy, is considered. Step (F7) increments OSTOTALMEM for OSy from 3428 MB to 3428+(MAX(8.75, 9)*50)=3428+(9*50)=3428+450=3878 MB. Step (F8) again asks "Another O/S?" and "No" is answered, and step (F9) asks "Another Application?" which is also answered "No". The flow then proceeds to (F10) which asks "Another User type?", and a "Yes" is answered here allowing flow to continue back to step (F2) where the next User-Type—Testers—is considered.

Steps (F3 through F9) are iterated for the Testers User-Type. This causes OSTOTALMEM(OSx) which is 3669.5 MB at this point, to be incremented as follows for each Application used by the Testers User-Type:

| | |
|---|---|
| For Application A: | [MAX (12, 8) * 0] |
| | = [12 * 0] |
| | = 0 MB |
| For Application B: | [MAX (6, 8) * 300] |
| | = [8 * 300] |
| | = 2400 MB |
| For Application C: | [MAX ((7*1.25), 8) * 100] |
| | = [8.75 * 100] |
| | = 875 MB |

So that after considering the Testers User-Type, OSTOTALMEM for OSx is [3669.5+0+2400+875]=6944.5 MB. Likewise, OSTOTALMEM for Osy, which is 3878 MB after analyzing the Developers and before Testers is considered, is thus incremented as follows:

| | |
|---|---|
| For Application A: | [MAX(12, 9) * 0] |
| | = [12 * 0] |
| | = 0 MB |
| For Application B: | [MAX (6, 9) * 300] |
| | = [9 * 300] |
| | = 2700 MB |
| For Application C: | [MAX ((7*1.25), 9) * 100] |
| | = [9 * 100] |
| | = 900 MB |

So that after considering the Testers User-Type, OSTOTALMEM for OSy is 3878+0+2700+900=7478 MB.

After the Testers User-Type is considered, Step (F10) asks "Another User Type?" which is answered with "No" for this example and flow continues to FIG. 1B, step (F11).

Here, step (F11) proceeds to get Server information from the Server Info Database (item 20, FIG. 2). The server information collected is then used in step (F12) to calculate the number of servers per solution (this process is described in more detail in the co-pending method entitled "Solution Generation Method For Thin ClientSizing Tool", U.S. Ser. No. 09/813,670. Within the server solution, it is indicated which of the supported Operating Systems is being employed. In step (F13), the Server's Operating System is determined by matching the Server's Operating System name with names that were previously stored in the OSNAME array in step (F1). Once the O/S is determined, the OSTOTALMEM for the corresponding Operating System is divided by the number of Servers in the solution to calculate the Memory Requirements for the specific Server as seen in step (F14) For our example, we will assume that the # of Servers in the solution was calculated to be 3 servers and that the Operating System employed is Osx, so that the Server's Memory requirements would be calculated at OSTOTALMEM(OSx)/3=6944.5/3 2314.833333 MB.

The flow proceeds to step (F15) where the query "Does the Solution involve more than One Server?" is proposed and for this example is answered "Yes". When more than one server is required for a solution, it necessitates the use of a particular software that is needed to coordinate the multiple servers in the Server Farm. This software requires an additional 64 MB of memory per server. So that when answered "Yes" at step (F15), 64 MB are added to the Server Memory Requirements at Step (F15Y) to make the Server Memory Requirements 2314.833333+64=2378.833333 MB.

Now, step (F16) asks the question "Are the Server Memory Requirements greater than or equal to 1000 MB?" If this is the case, as it is in our example, "Yes" is answered and step (F16Y) indicates that the memory units are converted from megabytes (MB) to gigabytes (GB). In this conversion process, the memory requirements are also rounded to the next highest 0.5 GB so that the memory requirements for our server are reflected as 2.5 GB. At step (F16Y2), this calculated value is 2.5 GB compared against both the Operating System's maximum memory capacity and the Server's maximum memory capacity, and set to the minimum value between the three values.

If the Server's memory requirements are more than the maximum capacity of either the Server or Operating System, then a warning message is displayed prior to returning the Server's Memory Requirements (in GB) at step (F17).

When step (F16N) is iterated due to the answer being "No" to "Is the Server Memory >=1000 MB?," the memory requirements are rounded to the nearest integer value (i.e., no fractions) prior to returning the Server's memory requirements (in MB) at step (F17).

Described herein has been a method and system which operates in aid of a Thin Client Sizing Tool which operates to select, design, and configure a network of one or more Server Farms which will fulfill the requirements for a particular customer's profile as originally developed in connection with U.S. Ser. No. 09/813,667.

Of great importance, is the estimation and calculation of the individual and total memory requirements for the totality of the number of Server Farms which may form a Metafarm.

In the present invention, procedures have been developed whereby each User type is correlated to each application used, so that the memory requirements for each application can be correlated to each User type and also correlated to each type of operating system so that the individual memory requirements for each application can be garnered from a sizing database and correlated to the type of User and the actual number of Users who use each User-type and each application, thus, to calculate the total memory requirements for the entire set of Server Farms and how these memory requirements can be distributed across the various servers.

Special situations occur in the method as when the application involves MS-DOS or 16-bit applications, where here, the procedure provides incrementation of the application memory by 25%.

Then by acquiring the server information from a database and calculating the number of servers required for the properly optimized solution for the customer, it is then possible to determine the server's operating systems from which to calculate the allocation of memory for each server by dividing the number of servers involved into the total memory requirements.

The method also queries whether more than one server is involved in which case, if more than one server is involved, then extra coordination software would be required which will cause an incrementation of server memory by at least 64 megabytes.

If the server memory is equal to or greater than 1,000 megabytes, then a conversion system is utilized to convert the megabytes to gigabytes and this is rounded to the nearest 0.5 gigabyte. On the other hand, if the server memory is not equal or greater than 1,000 megabytes, then the server memory is rounded to the nearest whole value.

As a result, the total server memory requirements and individual server memory requirements can be established and provided for in the Thin Client Sizing Tool.

While one particular example of utilization for the methodology of calculating memory requirements for a Server Farm or Metafarm has been shown, it should be understood that this example has been illustrative and the invention is to be considered as encompassed by the following claims.

What is claimed is:

1. In a Thin Client Sizing Tool for configuring one or more Server Farms which optimize a network suitable for an enterprise which supports a given customer profile said sizing tool providing an Application Delivery Solution Configurator which accesses information from a Server Information Database, a Sizing Database, a Configuration Database Template, and a Configuration Session Database, a method for establishing the memory requirements for the Farm configuration developed by said Application Delivery Solution Configurator, comprising the steps of:
   (a) calculating, via said Application Delivery Solution Configurator, the memory requirements for each User-type utilizing each application available including the steps of:
      (a1) accessing from said sizing database the memory requirements for each application being utilized;
      (a2) incrementing the memory requirements by adding the product of the MAX FUNCTION times the number of Users, where the MAX FUNCTION is the larger MX of either the MA (amount of memory allocated for each application by the operating system) or MS (the amount of Server memory needed for each operating system to allocate for each User);
   (b) utilizing information from said Configuration Session Database to enable said Application Delivery Solution Configurator to determine the number of Servers required for the optimum Server configuration;
   (c) calculating the memory requirements for each Server using information from said Sizing Database and said Configuration Session Database.

2. The method of claim 1 which includes the step of:
   (d) developing the total memory requirements for the configuration by dividing the total memory requirements by the number of Servers.

3. The method of claim 1 wherein step (a1) includes the steps of:
   (a1a) determining if the application involved is MS-DOS or 16-bit oriented;
   (a1b) if (a1a) is MS-DOS or 16-bit oriented, then incrementing by 25% the amount of memory allocated for each application by the operating system involved.

4. The method of claim 1 wherein step (c) includes the steps of:
   (c1) calculating the number of Servers needed for an optimal configuration by utilizing said Application Delivery Solution Configurator;
   (c2) determining the type of operating system for each server;
   (c3) calculating the required server memory for each server;
   (c4) determining that said optimal server configuration involves just one server;
   (c5) querying to see if the individual Server memory requirement is less than 100 MB;
   (c6) if step (c5) is less than 100 MB, then rounding-off the value of server memory to the nearest whole number.

5. The method of claim 4 which includes the step of:
   (c7) accessing Server information from said Server Information Database.

6. The method of claim 4 wherein step (c3) includes the step of:
   (c3a) dividing the total server memory required for the optimal configuration by the total number of servers involved.

7. The method of claim 4 wherein step (c4) includes the step of:
   (c4a) determining that said optimal server configuration involves more than one server;
   (c4b) if step (c4a) involves more than one server, then incrementing the memory requirement for each server by 64 MB.

8. The method of claim 4 wherein step (c5) includes the steps of:
   (c5a) querying to see if the individual server memory requirement is equal to or greater than 1,000 MB;
   (c5b) if step (c5a) is equal to or greater than 1,000 MB, then converting each server memory requirement to Gigabytes;
   (c5c) establishing the total memory requirements TM as the smallest number, Nm, of either Ox (maximum amount of operating system memory) or Oy (maximum server memory required).

9. A system for aiding a Thin Client Sizing Tool used to configure an optimal one or more Server Farms for a customer profile, said optimal Server Farms being configured by an Application Delivery Solution Configurator means and establishing the memory requirements for the Server Farm configuration, said system comprising:
   (a) server information database means for holding benchmark and information data on selected servers;

(b) sizing database means for storing the optimal number of servers for a customer profile and the Availability level of each server;

(c) configuration database template means for providing a format to collect information from data on window screens input as a customer's profile;

(d) configuration session database means for holding and supplying data to an Application Delivery Solution Configurator means;

(e) said Application Delivery Solution Configurator means for executing algorithms to develop an optimized configuration for a Server Farm;

(f) means for developing a customer profile of requirements via inputting data on a series of window screens;

(g) means to calculate the memory requirements for each Server with respect to each type of operating system, each type of application involved and each type of User involved.

10. A method for determining the memory requirements for a Thin Client Sizing Tool having an Application Delivery Solution Configurator means which can access database information means for working parameters comprising the steps of:

(a) acquiring information from a set of database means regarding the operating systems involved, the types of Users, the applications involved, and the number of Users for each application and each operating system;

(b) accessing information from a server database means as to the memory requirements for each User of each application, and the memory requirement for each operating system;

(c) establishing the number and type of servers for an optimal solution for the customer profile;

(d) calculating the total memory required for the optimal server configuration as Delivery Solution configured by said Application Configurator means;

(e) calculating the memory required for each server.

11. The method of claim 10 wherein step (e) includes the steps of:

(e1) determining that the optimal solution involves more than one (1) server;

(e2) incrementing the memory requirement by 64 MB for each server.

12. The method of claim 10 wherein step (e) includes the steps of:

(ea) determining that the optimal solution requires only one Server;

(eb) establishing that the memory requirement per server is less than 1,000 Mega Bytes;

(ec) rounding-out the final memory requirement per server to the nearest 0.5 Gigabytes.

* * * * *